No. 728,199. PATENTED MAY 19, 1903.
E. W. BURGESS.
RAISING OR LOWERING DEVICE FOR HARVESTER FRAMES.
APPLICATION FILED JUNE 9, 1902.
NO MODEL. 2 SHEETS—SHEET 1.

Witnesses
Chas. R. Straughn
Louis O. Zedler

Inventor
Edward W. Burgess

No. 728,199. Patented May 19, 1903.

UNITED STATES PATENT OFFICE.

EDWARD W. BURGESS, OF MILWAUKEE, WISCONSIN, ASSIGNOR TO INTERNATIONAL HARVESTER COMPANY, OF CHICAGO, ILLINOIS, A CORPORATION OF NEW JERSEY.

RAISING OR LOWERING DEVICE FOR HARVESTER-FRAMES.

SPECIFICATION forming part of Letters Patent No. 728,199, dated May 19, 1903.

Application filed June 9, 1902. Serial No. 110,765. (No model.)

*To all whom it may concern:*

Be it known that I, EDWARD W. BURGESS, a citizen of the United States, residing at Milwaukee, in the county of Milwaukee and State of Wisconsin, have invented certain new and useful Improvements in Raising or Lowering Devices for Harvester-Frames, of which the following is a specification, reference being had to the accompanying drawings, forming a part thereof.

My invention relates to improvements in the mechanism for adjusting the frame of a harvester or similar machine from a higher to a lower plane relative to the carrying-wheels; and the object of the invention is to provide a mechanism that will be both positive in its operation and easily manipulated. I attain these objects by the mechanism illustrated in the accompanying drawings, in which—

Figure 1:
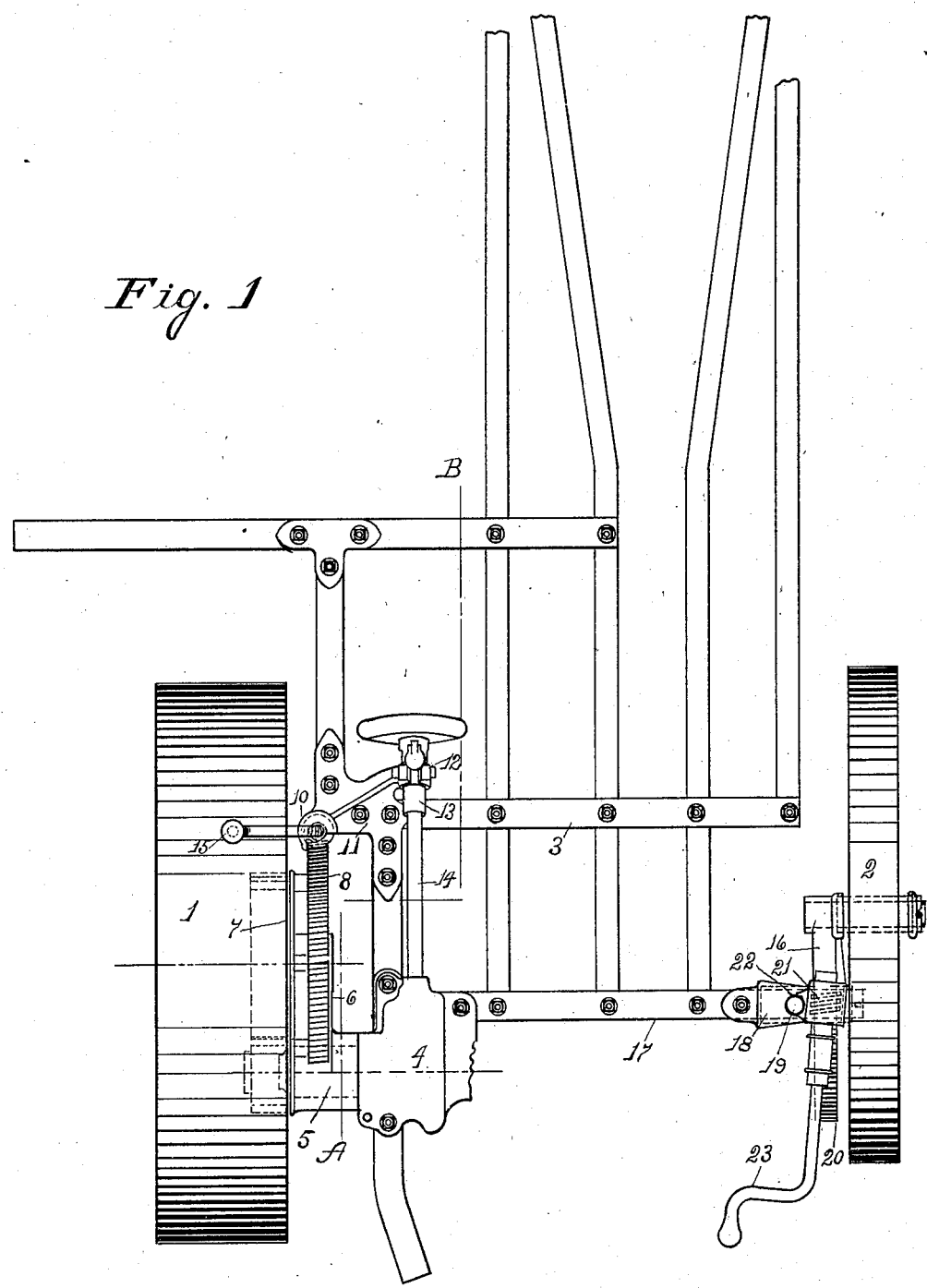
Figure 2:
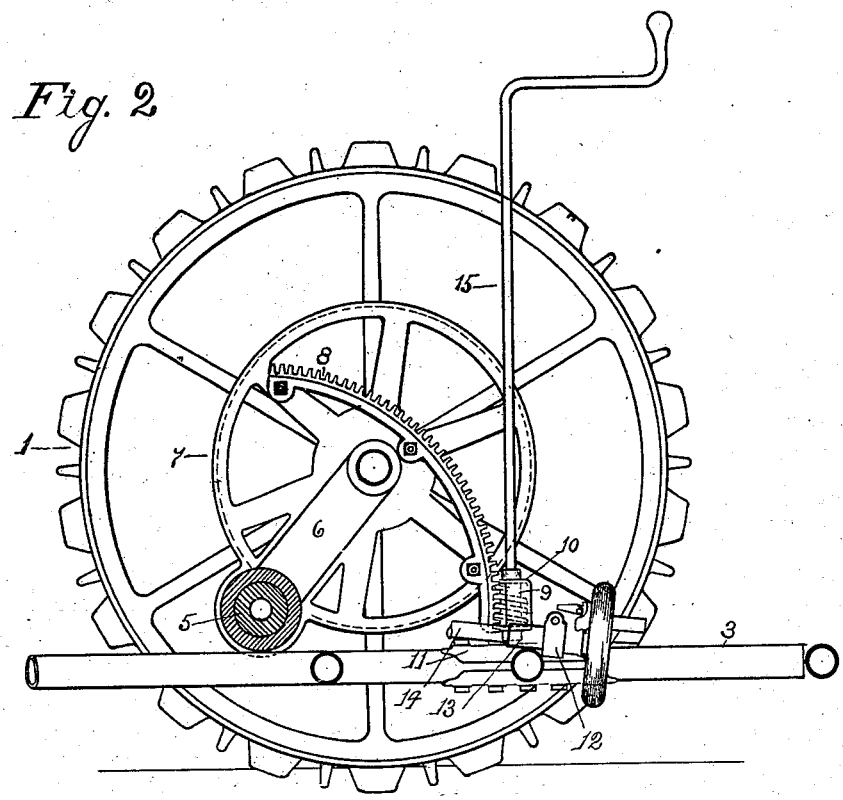
Figure 3:
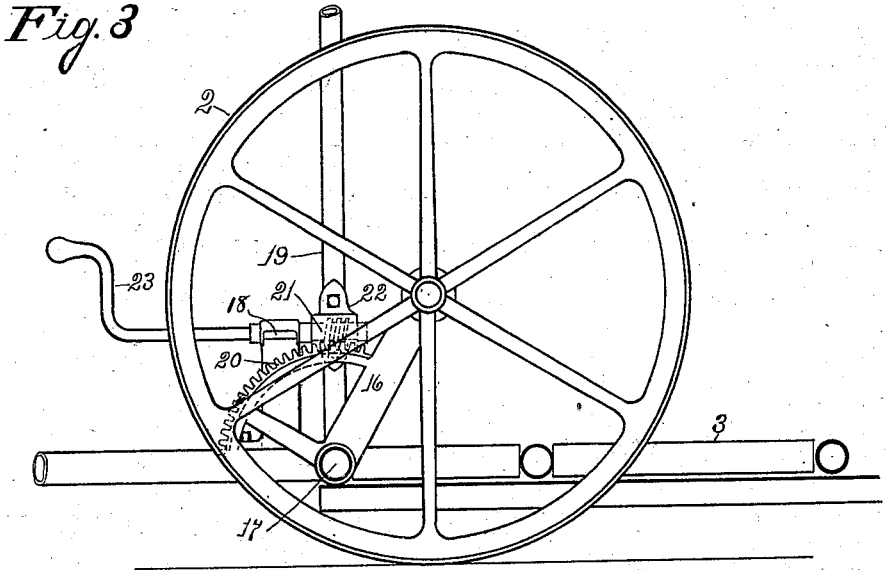

Figure 1 is a plan view of so much of a harvester-frame as is thought sufficient to describe my invention. Fig. 2 is an elevation and vertical section on line A B, Fig. 1. Fig. 3 is a side elevation of the grain-wheel side of Fig. 1.

Like numerals refer to like parts throughout the several views.

1 is the main drive-wheel, and 2 is the grain-wheel.

3 represents the main frame of the harvester.

4 is a portion of the gear-frame secured to the rear corner of the main frame 3. The gear-frame has a horizontally-projecting sleeve 5, that forms a bearing for the main counter-shaft. (Not shown.) Journaled on sleeve 5 is a radius-arm 6, the opposite end of which carries the axle of the main drive-wheel. The radius-arm 6 also carries the gear-shield 7 and the sector worm-rack 8, engaging with the worm 9, supported by the casing 10. The casing 10 forms a part of a joint-plate 11, secured to meeting members of the main frame 3 at the front inner corner. The joint-plate 11 is also provided with a short sleeve portion 12, that receives the self-alining journal-box 13 at the front end of the cutter crank-shaft 14.

15 is a hand-crank shaft journaled in the upper and lower ends of the casing 10 and to which the worm 9 is secured.

The grain-wheel 2 is journaled on an axle that is supported by the arm 16, journaled on the extended end of the rear sill 17 of the main frame 3. A bracket 18 is secured to the sill 17, forming a shoulder against which the sleeve of the arm 16 abuts and also forms a lower support for an upright frame-pipe 19. The arm 16 is provided with a worm sector-rack 20 concentric with the pipe-sill 17. A worm 21, partially inclosed in a casing 22, secured to the upright pipe 19, has a crank 23 secured thereto. The crank 23 has bearings at each end of the casing 22.

When it is desired to raise or lower the frame of the machine on the main-wheel side, the operator revolves the worm 9 by means of the crank-shaft 15, and the worm engaging with the teeth on the sector-rack 8 will swing the radius-arm 6 upon its axis in the main wheel, and it, through its pivotal connection with the gear-frame 4, will raise or lower the wheel-frame 3, as desired. In the same manner if the crank 23 be turned the worm 21, secured thereto and engaging with the sector-rack 20, will swing arm 16 around its axis on the sill-pipe 17 and raise or lower the frame of the machine on the grain-wheel side.

I do not herein claim the construction of the wheel-frame, as the same forms the subject-matter of and is claimed in my application Serial No. 110,768, filed June 9, 1902.

What I claim as my invention, and desire to secure by Letters Patent, is—

1. In a corn-harvester, the combination of the main frame having a transverse sill at the rear thereof, an upright frame member secured to said rear sill, a grain-wheel, a grain-wheel-supporting arm, a gear-sector secured to said arm, said gear-sector being concentric with the axis of the arm, a worm secured to the upright frame member, and engaging with the gear-sector, the wheel-supporting arm journaled on the end of the transverse sill, and a crank-shaft for operating the worm to rock the supporting-arm about its axis.

2. In a harvester, the combination of the traction-wheel, the main frame, a gear-frame secured to the rear inner corner of the main frame, a counter-shaft journaled in said gear-frame, a radius-arm connecting the axis of the traction-wheel with the axis of the counter-shaft, a gear-shield carried by said radius-arm, a sector-rack secured to the radius-arm, a worm mounted on the main frame and meshing with the rack, and a crank-shaft for operating the worm to rock the radius-arm around its axis.

3. In a harvester, the combination of the traction-wheel, the main frame, a gear-frame secured to the rear inner corner of the main frame, a counter-shaft journaled in said gear-frame, a radius-arm connecting the axis of the traction-wheel with the axis of the counter-shaft, a sector-rack secured to the radius-arm, a worm meshing with said rack, a joint-plate uniting the members of the main frame at the front inner corner, a worm-support forming part of said joint-plate, a worm journaled therein, and a hand-crank shaft for operating the worm to rock the radius-arm around its axis.

4. In a harvester, the combination of the traction-wheel, the main frame, a gear-frame secured to the rear inner corner of the main frame, a counter-shaft journaled in the gear-frame, a cutter-crank shaft, a radius-arm connecting the axis of the traction-wheel with the axis of the counter-shaft, a sector-rack secured to the radius-arm, a worm meshing with said rack, a joint-plate uniting the members of the main frame at the front inner corner, a bearing for the cutter-crank shaft forming part of the joint-plate, a worm-casing secured to the joint-plate, a worm journaled in said casing, and a hand-crank shaft for operating the worm to rock the radius-arm on its axis.

5. In a harvester, the combination of the main frame, the grain-wheel, a wheel-supporting arm pivoted to the main frame and extending normally upward and carrying the axis of the grain-wheel, a curved sector-rack connected to the arm between its pivot and the wheel-axis, a hand-crank mounted in horizontal bearings on the main frame, and a worm carried by the crank and engaging directly with the sector-rack.

In witness whereof I hereto affix my signature in presence of two witnesses.

EDWARD W. BURGESS.

Witnesses:
FRANK J. DRYBURGH,
EARLE J. BRYDEN.